Figure 1:
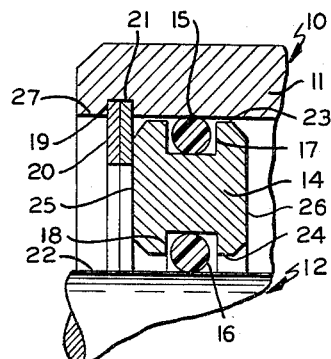

United States Patent Office 3,001,385
Patented Sept. 26, 1961

3,001,385
FLEXIBLE COUPLING AND SEAL THEREFOR
Edward E. Allen, Erie, Pa., assignor to Zurn Industries, Inc., Erie, Pa., a corporation of Pennsylvania
Filed Oct. 13, 1958, Ser. No. 767,044
17 Claims. (Cl. 64—9)

This invention relates to gear couplings and, more particularly, to gear couplings in combination with seals for preventing the loss of lubricant from the gear couplings.

In gear couplings of the general type disclosed herein, it has always been a problem for designers and mechanics to provide seals which would result in an efficient structure against the loss of lubricant and, at the same time, prevent the entry of foreign material to the internal parts of the coupling. Further, it has been difficult to provide seals of this kind in flexible type gear couplings which must have a substantial amount of misalignment capacity to allow one part thereof to gyrate relative to the other during operation.

It is, accordingly, an object of the present invention to provide a seal which provides an efficient closure against loss of lubricant or entry of foreign material. The seal disclosed herein is also capable of withstanding end thrust and has substantial misalignment capacity. In the basic construction disclosed, the seal has considerable static resiliency in its sealing member and the sealing member may be designed to take a substantial amount of deflection to accommodate misalignment. The resilient lubricant seal adjacent the shaft will compensate for misalignment. The device may be of unit or multiple construction and sealing elements are replaceable without removing the hub or sleeve from the shaft.

More specifically, it is an object of the invention to provide a seal which carries out the above objectives and overcomes the previous disadvantages inherent in seals and, more especially, it is an object of this invention to provide a seal in combination with a gear coupling which is simple in construction, economical to manufacture, and simple and efficient in operation.

Another object of the invention is to provide a positive seal in combination with a gear type flexible coupling which prevents the loss of lubricant and the entry of foreign material.

A further object of the invention is to provide a seal in combination with a gear type coupling wherein the seal has substantial misalignment capacity.

Still a further object of the invention is to provide a seal wherein the parts of the sealing member are replaceable without removing the hub or sleeve from the shaft.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIGS. 1 to 6 inclusive are longitudinal cross sectional views of fragmentary portions of a sealing device according to the invention shown with a part of a flange and shaft of a gear coupling.

Figure 3:
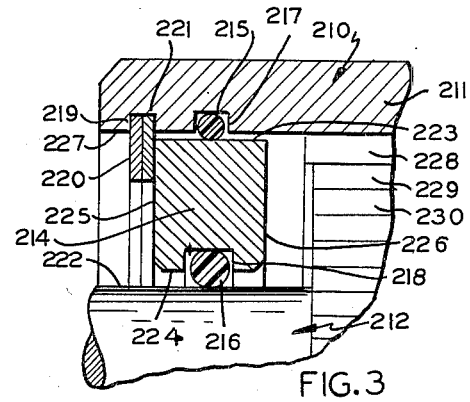

In addition to the structure shown in FIGS. 1, 2, 4, 5, and 6, parts of the gear teeth of the coupling along with the seal according to the invention are shown in enlarged cross section in FIG. 3.

Now with more specific reference to the drawing, in the embodiment of the invention shown in FIG. 1, a coupling 10 is shown having an outwardly extending flange 11 disposed around a shaft 12 and concentric thereto. A sealing washer 14 surrounds the shaft 12 and is disposed concentric thereon with a substantial clearance between an inner periphery 24 of the sealing washer 14 and an outer periphery 22 of the shaft 12. The sealing washer 14 may be made of steel or some other relatively strong, fairly rigid material so that it will withstand end thrust of a type resulting from the engagement thereagainst by the ends of a hub which may be mounted on the shaft 12 when the hub moves axially due to end play of the shaft 12.

The outer peripheral surface 23 of the washer 14 has an outer O-ring groove 17 formed therein and an outer O-ring 15 is disposed in the outer O-ring groove 17. An inner O-ring groove 18 is formed in the inner peripheral surface 24 of the washer 14 and an inner O-ring 16 is disposed therein. The grooves 17 and 18 will be substantially wider than the respective diameters of the round cross sections of the O-rings 15 and 16 so that the O-rings 15 and 16 will be allowed a substantial lateral movement therein and the distance between the bottom of the groove 17 and an inner peripheral surface 27 of the flange 11 and the corresponding distance between the bottom of the groove 18 and the peripheral surface 22 of the shaft 12 will be slightly less than the respective cross sectional diameter of the O-rings 15 and 16 whereby the O-rings 15 and 16 will be slightly compressed in the radial direction.

A groove 19 is formed in the flange 11 outwardly of the washer 14. An outer snap ring 20 and an inner snap ring 21 are disposed in the groove 19. The snap rings 20 and 21 limit the outward axial sliding movement of the washer 14 by coming to rest against an outer surface 25 of the washer 14.

While flanges 11, 111, 211, 311, 411, and 511 of the several embodiments of the invention are all in the form of hollow cylinders having internal teeth formed therein and shafts 12, 112, 212, 312, 412, and 512 are all cylindrical shafts disposed concentric to the flanges, respectively, each of the shafts 12, 112, 212, 312, 412, and 512 is adapted to have hubs thereon similar to a hub 230 in FIG. 3 and these hubs have external teeth. The hubs may move axially so that the ends of their external teeth engage inner surfaces 26, 126, 226, 326, 426, and 526, respectively, of washers 14, 114, 214, 314, 414, and 514. The central axes of the shafts may vary relative to the axes of the sleeves and run out of alignment therewith so that a gyration type of movement results.

The embodiments of the invention shown in FIGS. 1 to 6 all show alternative ways of applying the improved sealing means disclosed.

Figure 2:
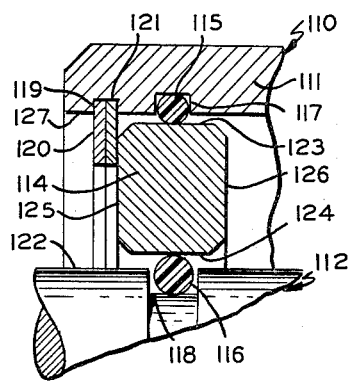

The embodiment of the invention shown in FIG. 2 is similar to that shown in FIG. 1 and corresponding parts are numbered with similar numerals having one hundred added thereto. In this embodiment, however, a groove 118 is formed in an outer peripheral surface 122 of a shaft 112 instead of in the washer. An O-ring 116 is disposed in the groove 118 and has its outer periphery in engagement with a flat inner peripheral surface 124 of a washer 114. It will be noted that an O-ring 115 is considerably smaller in cross sectional diameter than the O-ring 116 and that there is considerably less clearance between an outer peripheral surface 123 of the washer 114 and an internal surface 127 of the flange 111 than the corresponding clearance between the internal surface 124 of the washer 114 and the outer peripheral surface 122 of the shaft 112. Therefore, the washer 114 is held relatively rigid against radial movement in the coupling 110 and the misalignment between the shaft 112 and the flange 111 which results in movement of the shaft 112 which is taken primarily between the washer 114 and the shaft 112 is somewhat less than in FIG. 1.

The embodiment of the invention shown in FIG. 3 is similar to the embodiments shown in FIGS. 1 and 2; however, internal teeth 228 are shown mating with external teeth 229 on the outer periphery of the hub 230. In this embodiment of the invention, a flange 211 has an internal groove 217 formed therein which receives an O-ring 215 which is substantially smaller in diameter than an O-ring 216. The inner surface of the O-ring 215 rests on an outer peripheral surface 223 of a washer 214 and forms a seal therewith. The dimensions of the groove 217 relative to the O-ring 215 are similar to those recommended for the application of O-rings.

The inner peripheral surface 224 of the washer 214 has a groove 218 formed therein. The groove 218 receives the O-ring 216. The clearance between the inner peripheral surface 224 of the washer 214 and the outer peripheral surface 222 of the shaft 212 is substantial in order to insure a considerable misalignment capacity of the shaft 212 so that it can run out of alignment with the axis of the flange 211 and the gyration thereof relative to the sleeve can thus be absorbed.

Figure 4:
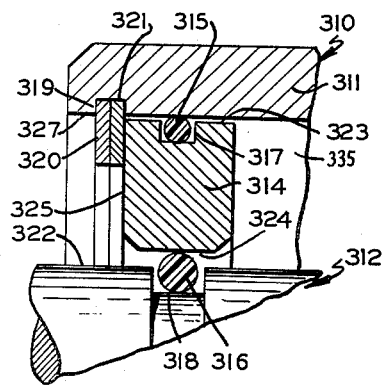

In the embodiment of the invention shown in FIG. 4, a washer 314 is disposed in a hollow 335 in a flange 311 of a coupling 310. The washer 314 is also disposed on a shaft 312 with a flat inner peripheral surface 324 in sealing engagement with an O-ring 316. The O-ring 316 is disposed in a groove 318 in the shaft 312. Snap rings 320 and 321 are disposed in an inner peripheral groove 319 in the flange 311.

Figure 5:
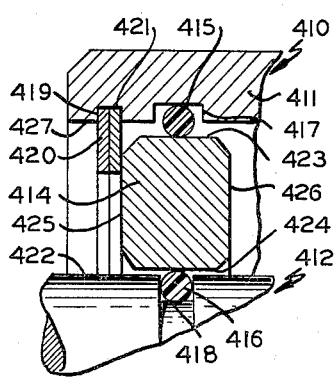

In the embodiment of the invention shown in FIG. 5, a flange 411 of a gear coupling 410 is disposed concentric to a shaft 412 and a washer 414. A groove 418 is formed in a periphery 422 of the shaft 412 and an O-ring 416 is received therein. The O-ring 416 makes sealing engagement with the washer 414. The washer 414 has a slight clearance between its internal surface 424 and the outer peripheral surface 422 of the shaft 412.

Figure 6:
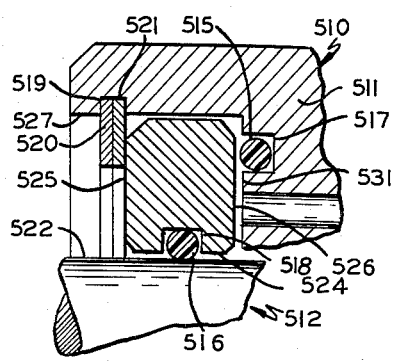

In the embodiment of the invention shown in FIG. 6, a washer 514 is disposed in the counterbore in the end of a flange 511. A surface 526 of the washer 514 abuts against the bottom of the counterbore while an O-ring 515 is disposed in a groove 517 which is formed in a surface 531 and rests against the surface 526 of the washer 514. There is considerable clearance between the inner peripheral surface 524 of the washer 514 and an outer peripheral surface 522 of a shaft 512 so that the shaft 512 may gyrate during rotation of the coupling 510 and the shaft 512 in misaligned relation with each other. Snap rings 520 and 521 are disposed in a groove 519. The snap rings 520 and 521 hold the washer 514 in position in the counterbore.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a gear type coupling comprising a hub having external teeth thereon, a sleeve having internal teeth engaging said external teeth on said hub, a shaft, said hub being disposed on said shaft, a washer generally rectangular in cross section disposed around said shaft, said sleeve having a flange extending beyond the ends of said external and internal teeth and overlying said shaft, a first groove in one of said flange and said washer, a first sealing ring in said first groove, said first sealing ring making sealing engagement with said flange and said washer, means to limit said washer against axial movement in said flange, a second sealing ring, and a second groove in one of said shaft and said washer, said second sealing ring making sealing engagement with said shaft and said washer, said washer being adapted to be engaged by said hub.

2. The combination recited in claim 1 wherein said first groove is formed in the outer periphery of said washer.

3. The combination recited in claim 1 wherein said first groove is formed in the inner periphery of said flange.

4. The combination recited in claim 1 wherein said second groove is formed in the inner periphery of said washer and said second sealing ring is disposed in said second groove.

5. The combination recited in claim 1 wherein a groove is formed in the inner periphery of said washer and said second sealing ring is disposed therein, and said first groove is formed in the inner periphery of said flange.

6. The combination recited in claim 1 wherein said first groove is formed in the inner periphery of said flange and said second groove is formed in the outer periphery of said shaft, said second sealing ring is disposed in said second groove, said washer has a flat external peripheral surface forming said sealing engagement with said first sealing ring, and said washer has a flat internal surface forming sealing engagement with said second sealing ring.

7. The combination recited in claim 6 wherein said washer fits relatively close to said shaft and has a relatively lesser external diameter than the diameter of said flange, said means to limit the movement of said washer comprises a third internal groove formed outwardly of said first groove, and a snap ring is provided in said third groove whereby said shaft may be operated in misaligned position relative to said sleeve and said washer will move inwardly and outwardly with said shaft.

8. The combination recited in claim 1 wherein said first groove is formed in the external periphery of said washer, said first sealing ring making sealing engagement with the internal periphery of said flange and said second groove in the outer peripheral surface of said shaft, and a flat inner peripheral surface on said washer, said second sealing ring making sealing engagement with the walls of said second groove and with said inner peripheral surface of said washer.

9. The combination recited in claim 1 wherein said means to limit the axial movement of said washer comprises an internal groove in said flange outwardly of said washer, and a first and a second snap ring in said internal groove, said snap rings engaging the outer surface of said washer.

10. The combination recited in claim 1 wherein said washer is rectangular in cross section, said washer having an outside flat surface, an inside flat surface, an inner peripheral flat surface, and an outer peripheral flat surface, some of said flat surfaces forming sealing engagement with said sealing rings.

11. In combination, a shaft and a sleeve with a sealing means forming a seal therebetween, said shaft extending into said sleeve, a washer disposed around said shaft, said sleeve overlying said shaft and said washer, a first groove in one of said washer and a flange, said flange overlying said shaft, a first sealing ring in said first groove and making sealing engagement with said washer and said sleeve, a second groove in one of said shaft and the inner periphery of said washer, and a second sealing ring making sealing engagement with said washer and said shaft, there being substantial clearance between the inside surface of said washer and said shaft.

12. The combination recited in claim 11 wherein said first groove is formed in the outer periphery of said washer.

13. The combination recited in claim 11 wherein a counterbore is formed in the end of said sleeve defining a shoulder, said first groove is formed in said shoulder, and said first sealing ring is disposed in said first groove.

14. The combination recited in claim 11 wherein a second groove is formed in the inner periphery of said washer and said second sealing ring is disposed in said second groove.

15. The combination recited in claim 11 wherein a groove is formed in the inner periphery of said washer and said second sealing ring is disposed therein, and said first groove is formed in the inner periphery of said flange.

16. The combination recited in claim 11 wherein said first groove is formed in the inner periphery of said flange and said second groove is formed in the outer periphery of said shaft, said second ring is disposed in said second groove, said washer has a flat external peripheral surface forming said sealing engagement with said first sealing ring, and said washer has a flat internal surface forming sealing engagement with said second sealing ring.

17. The combination recited in claim 11, wherein said first groove is formed in the external periphery of said washer, said first sealing ring making sealing engagement with the internal preiphery of said flange and a second groove in the outer peripheral surface of said shaft, and a flat inner peripheral surface on said washer, said second sealing ring making sealing engagement with the walls of said second groove and with said inner peripheral surface of said washer.

References Cited in the file of this patent
UNITED STATES PATENTS

| | | |
|---|---|---|
| 2,682,760 | Shenk | July 6, 1954 |
| 2,744,449 | Belden et al. | May 8, 1956 |
| 2,787,894 | Hamann | Apr. 9, 1957 |
| 2,861,435 | Seanor | Nov. 25, 1958 |